US011952541B2

(12) United States Patent
Eizenga et al.

(10) Patent No.: US 11,952,541 B2
(45) Date of Patent: Apr. 9, 2024

(54) PROCESS FOR HYDROTREATING A FEED STREAM COMPRISING A BIORENEWABLE FEEDSTOCK WITH TREATMENT OF AN OFF-GAS STREAM

(71) Applicant: UOP LLC, Des Plaines, IL (US)

(72) Inventors: Donald Eizenga, Elk Grove Village, IL (US); James T. Wexler, Wheaton, IL (US); Rafael Alcala, Glen Ellyn, IL (US); Xin X. Zhu, Long Grove, IL (US); Jan De Ren, Bracknell (GB); Saravanaperumal Sivaprakasam, Gurgaon (IN)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 17/498,987

(22) Filed: Oct. 12, 2021

(65) Prior Publication Data
US 2023/0110965 A1    Apr. 13, 2023

(51) Int. Cl.
*B01D 53/52*     (2006.01)
*B01D 53/047*    (2006.01)
(Continued)

(52) U.S. Cl.
CPC ............. *C10G 3/62* (2013.01); *B01D 53/047* (2013.01); *B01D 53/1487* (2013.01); *B01D 53/1493* (2013.01); *B01D 53/343* (2013.01); *B01D 53/501* (2013.01); *B01D 53/52* (2013.01); *B01D 53/73* (2013.01); *B01D 53/75* (2013.01); *B01D 53/78* (2013.01); *C10G 3/42* (2013.01); *C10G 3/50* (2013.01); *B01D 2251/304* (2013.01); *B01D 2252/205* (2013.01); *B01D 2257/302* (2013.01); *B01D 2257/304* (2013.01); *B01D 2257/502* (2013.01); *B01D 2257/504* (2013.01); *B01D 2257/702* (2013.01); *B01D 2258/0283* (2013.01); *C10G 2300/1011* (2013.01);
(Continued)

(58) Field of Classification Search
None
See application file for complete search history.

(56) References Cited

U.S. PATENT DOCUMENTS 6,096,195 A    8/2000   Streicher et al.
8,066,845 B2*  11/2011  Duesel, Jr. ................ C02F 1/10
                                              210/767

(Continued)

OTHER PUBLICATIONS

Search Report and Written Opinion for PCT/US2022/077753 dated Jan. 20, 2023.

*Primary Examiner* — Tam M Nguyen
(74) *Attorney, Agent, or Firm* — Paschall & Associates, LLC; James C. Paschall

(57) ABSTRACT

A process for hydrotreating a feed stream comprising a biorenewable feedstock is disclosed. The process comprises hydrotreating the feed stream in the presence of a hydrotreating hydrogen stream and a hydrotreating catalyst to provide a hydrotreated stream. The hydrotreated stream is separated into a hydrotreated liquid stream and a hydrotreated gas stream. The hydrotreated liquid stream is subjected to stripping to provide a stripper off-gas stream. At least a portion of the stripper off-gas stream is contacted with a caustic stream to provide a sulfur-lean gas stream and a sulfur-rich caustic stream. The sulfur-rich caustic stream is further treated to provide a treated gas stream.

17 Claims, 1 Drawing Sheet

(51) Int. Cl.
  *B01D 53/14*   (2006.01)
  *B01D 53/34*   (2006.01)
  *B01D 53/50*   (2006.01)
  *B01D 53/73*   (2006.01)
  *B01D 53/75*   (2006.01)
  *B01D 53/78*   (2006.01)
  *C10G 3/00*    (2006.01)

(52) U.S. Cl.
  CPC ........... *C10G 2300/4043* (2013.01); *C10G 2300/405* (2013.01); *C10G 2300/4081* (2013.01); *C10G 2300/703* (2013.01)

(56) References Cited

U.S. PATENT DOCUMENTS

| | | | |
|---|---|---|---|
| 10,195,564 B2 * | 2/2019 | Kumar | C02F 3/341 |
| 10,443,001 B2 | 10/2019 | Jani | |
| 10,619,111 B2 | 4/2020 | Hao et al. | |
| 2004/0040671 A1 * | 3/2004 | Duesel, Jr. | B01D 1/14 |
| | | | 159/47.1 |
| 2006/0151359 A1 | 7/2006 | Ellis et al. | |
| 2008/0286703 A1 * | 11/2008 | Comrie | B01D 53/501 |
| | | | 431/2 |
| 2018/0119032 A1 * | 5/2018 | Jani | C10G 45/44 |
| 2020/0255752 A1 * | 8/2020 | Lawson | C10G 67/04 |
| 2020/0332204 A1 | 10/2020 | Ilyas et al. | |
| 2022/0033722 A1 * | 2/2022 | De Ren | C02F 1/72 |
| 2022/0041527 A1 * | 2/2022 | Khamidulin | B01D 53/343 |
| 2022/0049166 A1 * | 2/2022 | Roy | C01B 3/24 |
| 2022/0098500 A1 * | 3/2022 | Suntio | C10G 3/50 |

\* cited by examiner

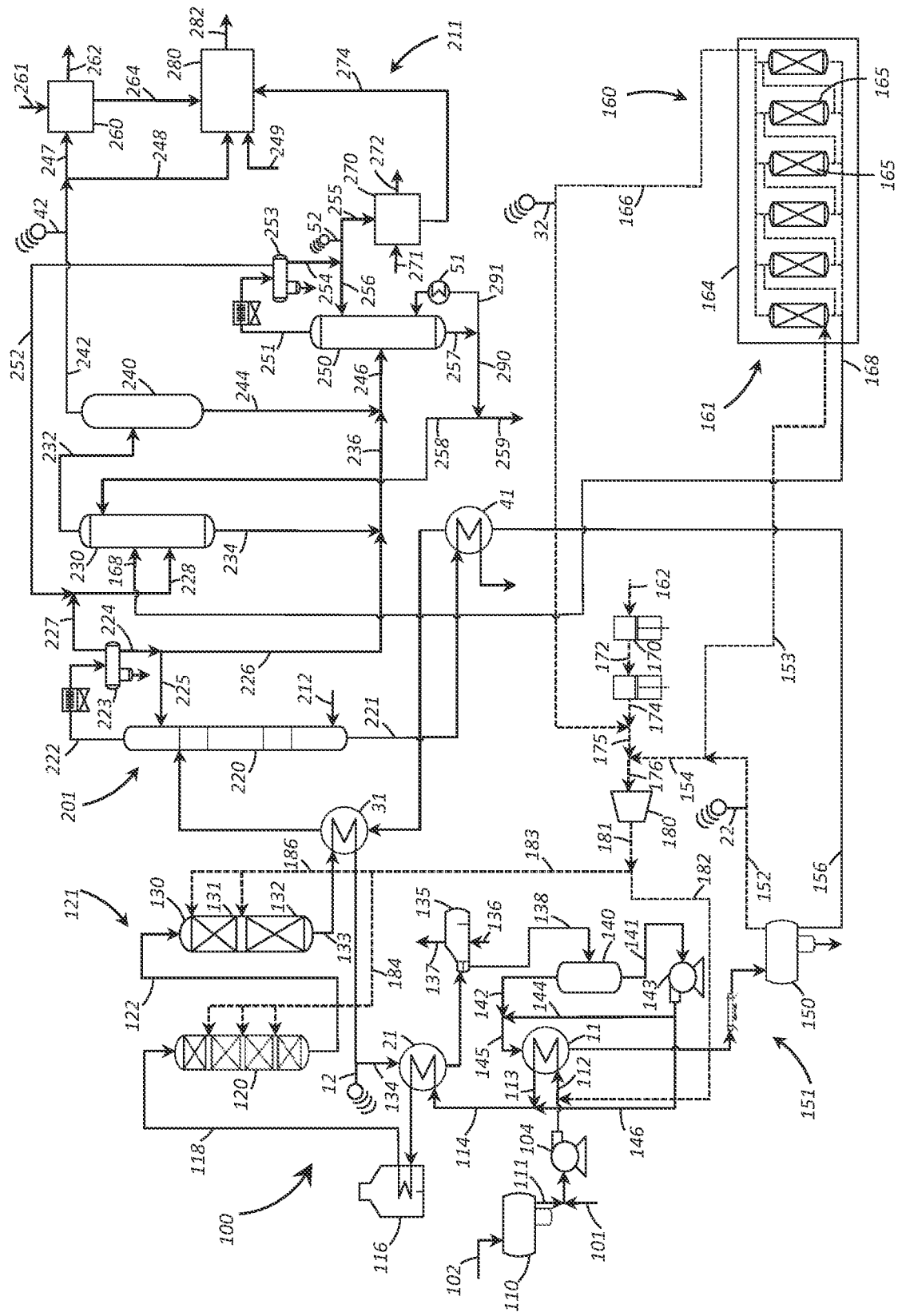

PROCESS FOR HYDROTREATING A FEED STREAM COMPRISING A BIORENEWABLE FEEDSTOCK WITH TREATMENT OF AN OFF-GAS STREAM

FIELD

The field is related to a process for hydrotreating a feed stream comprising a biorenewable feedstock. Particularly, the field relates to a process for hydrotreating a feed stream comprising a biorenewable feedstock with treatment of an off-gas stream with caustic and a spent caustic treatment.

BACKGROUND

As the demand for reduced carbon emissions expands, there is an increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to remove metals and deoxygenate oxygenated hydrocarbons followed by hydroisomerization to improve cold flow properties of product diesel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

The hydrotreatment of a biorenewable feedstock deoxygenates the oxygenated hydrocarbons resulting in production of $H_2O$, $CO_2$ and CO in the hydrotreated effluent. Carbon dioxide may be removed from a recycle hydrogen gas in an amine recycle gas scrubber. However, reducing carbon monoxide concentration requires other means such as purging or a water gas shift reaction which forms carbon dioxide. Carbon monoxide is poisonous to hydrotreating catalyst and therefore must be removed to avoid buildup of a deactivating concentration of carbon monoxide.

Biorenewable feedstock contains less sulfurous hydrocarbons than mineral feedstock. Thus, relatively less hydrogen sulfide is produced in the hydrotreatment of biorenewable feedstocks. Hydrotreating catalyst requires sulfidation to ensure the catalyst is activated.

While recovering the products from the hydroprocessed stream, a gas stream, usually termed as "recycle gas" is produced having impurities such as carbon oxides, hydrogen sulfide as well as light hydrocarbons. The recycle gas stream can be subjected to treatment step to recover valuable products. Typically, the treatment step for the recycle gas stream includes an amine treatment step in a recycle gas scrubber. However, the typical amine treatment for recycle also includes a sulfur recovery unit along with recycle gas scrubber to remove sulfur from the gas stream coming from the amine treatment unit and withdrawal of the remaining gas stream as a treated stream. Thus, amine treatment may reduce the available sulfur in the recycle gas. The removal of sulfur then increases the sulfur injection rate to the process required to ensure the catalyst is activated. Such an amine treatment step may increase the overall capital and operational expense of the process.

Further, along with the recycle gas, an "off-gas" stream may also be produced after recovering the products from the hydroprocessed stream. Typically, an amine treatment step in an off-gas scrubber is used for hydrogen sulfide removal from the off-gas stream. However, such amine treatment for the off-gas stream requires an amine regeneration unit and a sulfur recovery unit with the off-gas scrubber which have high capital and operating costs. If it is considered to omit the recycle gas scrubber for amine treatment of the recycle gas to save on sulfur injection, the total amine required for treating the off-gas and the recovered hydrocarbons such as LPG hydrocarbons in an amine treatment unit may decrease and so may the cost of an amine treatment unit. However, the amine treatment unit cost would still be complex and there is poor economy of scale for a very small amine and sulfur recovery unit only for the off-gas stream.

Accordingly, it would be desirable to provide a process and apparatus for the production of distillate hydrocarbons from a biorenewable feedstock that assures sufficient sulfidation of hydrotreating catalyst. Also, it would be desirable to provide a cost-efficient process and apparatus for an alternate treatment of the off-gas stream to save capital expenditure and minimize sulfur injection rate for the biorenewable feedstock.

SUMMARY

The present disclosure provides a process and an apparatus for hydrotreating a feedstock wherein caustic treatment is used for treating/purifying the off-gas stream. The process does not include an amine treatment step for the off-gas stream. The process ensures optimum sulfur presence in the recycle gas for the process. The process reduces the amount of sulfur that needs be added to the biorenewable feedstock to assure adequate sulfidation of the hydrotreating catalyst. The applicants have found unique caustic treatment steps for the off-gas stream that reduces an overall amount of caustic required for treatment as compared to a typical caustic treatment process and also generates a lower volume of spent caustic. The process further provides an efficient treatment step for the spent caustic.

BRIEF DESCRIPTION OF THE DRAWINGS

FIGURE is a simplified process flow diagram of the present disclosure.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripper columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "end point" (EP) means the temperature at which the sample has all boiled off using ASTM D2887, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

The term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

DETAILED DESCRIPTION

A hydrotreating unit may process biorenewable feeds containing natural oils and fats such as triglycerides and free fatty acids from animal and vegetable materials to convert them to green jet fuel and/or diesel. Biorenewable feeds undergo hydrodemetallization, and hydrodeoxygenation reactions followed by hydroiso-dewaxing, hydroisomerization and/or hydrocracking. In a two-stage unit, hydrogen sulfide generated in the hydrodemetallization, and hydrodeoxygenation reactions are removed from an interstage hydrotreated stream, so the hydroiso-dewaxing, hydroisomerization, or hydrocracking reactions occur in a sweet environment. "Sweet" denotes that sulfur has been removed from the environment; whereas, "sour" denotes that sulfur is present in the environment. In a single stage unit, the hydrogen sulfide remains present in a sour environment for the downstream hydroiso-dewaxing, hydroisomerization, or hydrocracking reactions.

The base metal hydrotreating catalysts for hydrodeoxygenation and hydrodemetallization are sulfided to be catalytically active. These hydrotreating reactions produce water and carbon oxides. The reducing hydrogen environment tends to strip sulfur from the hydrotreating catalyst causing deactivation. Since the biorenewable feeds do not have much sulfur content, sulfur is injected into the fresh feed in the form of dimethyl disulfide, polysulfides, disulfide oils, or a refinery sour gas containing hydrogen sulfide to maintain catalyst activity. The process enables reducing the amount of sulfur injected into the system with the fresh feed by maintaining sufficient hydrogen sulfide in the recycle gas.

Further, for the hydrotreating unit processing a feed comprising a biorenewable feedstock, the volume of carbon oxides, particularly carbon dioxide, being produced varies as the reactions proceed with time. An acid gas treating system is needed to remove carbon dioxide to maintain hydrogen purity. Additionally, the produced carbon monoxide is a catalyst poison that inhibits hydrotreating catalyst activity. Carbon monoxide converts to carbon dioxide via the water gas shift reaction, so removal of the carbon dioxide via an amine solvent absorption column maintains the carbon monoxide concentration low. Traditionally, an amine acid gas treating system is installed on the recycle gas circuit by which both carbon dioxide and hydrogen sulfide are removed because hydrogen sulfide is a stronger acid than carbon dioxide.

The present disclosure provides a process which does not use an amine treatment unit for the off-gas stream and the recycle gas stream. The present process comprises caustic treatment steps for the off-gas stream from a product recovery unit. Applicants have found that the off-gas stream may comprise a comparatively higher volume of carbon dioxide compared to a volume of the hydrogen sulfide present in the off-gas stream. The variable volume of carbon oxide being produced in the hydrotreating unit has a bearing on the volume of carbon dioxide present in the off-gas stream. In accordance with applicants' findings, applicants process includes a selective removal of hydrogen sulfide over the carbon dioxide present in the off-gas stream.

The process with caustic treatment for the off-gas stream with no amine treatment unit on the recycle gas circuit saves capital and operational expense of the process. In a typical amine treatment unit, there is a sulfur recovery unit to condense out any sort of sulfur from the gas stream coming from the amine treatment unit and withdraw the remaining gas stream. The disclosed process omits an amine treatment unit and the concomitant sulfur recovery unit.

The proposed process includes caustic treatment for the off-gas stream and the spent caustic stream is further treated in a thermal oxidation unit. Thus, the spent caustic stream may not need to be regenerated. Accordingly, the process does not use an intermediate unit operation like an amine treatment unit and the concomitant sulfur recovery unit. Also, a comparatively higher volume of sulfur is available in the form of hydrogen sulfide in the recycle gas recycle gas circuit because there is no intermediate unit operation like an amine treatment unit for the recycle gas. Therefore, the disclosed process reduces the volume of sulfur injected into the system with the fresh feed by maintaining sufficient hydrogen sulfide in the recycle gas.

Also, a purge stream from a hydrotreated gas stream can be purified to remove carbon dioxide and increase hydrogen purity of the recycle gas stream when added back to a recycle gas stream. The purification unit can involve contacting the recycle gas stream with one or both of a solid media or with an absorbent stream to remove impurities. Because the recycle gas stream contains the majority of hydrogen sulfide from the purge stream the non-indigenous sulfur injection into the reactor will be reduced or eliminated.

In the FIGURE, in accordance with an exemplary embodiment, a process and apparatus 100 is shown for processing a feed stream comprising a feedstock. The process and apparatus 100 comprise a hydrotreating section 121, a separation section 151, a purification unit 160, and a product recovery section 201. In an exemplary embodiment, the feed stream may comprise a biorenewable feedstock. A feed line 102 transports a feed stream into a feed surge drum 110. The feed stream may be blended with a feedstock to provide the feed comprising a feedstock. In an exemplary embodiment, the feed stream may be blended with biorenewable feedstock to provide a feed stream comprising a biorenewable feedstock. Alternatively, the feed stream may be called as a biorenewable feed stream. In another exemplary embodiment, the feed stream may be blended with a mineral feed stream. A mineral feedstock is a conventional feed derived from crude oil that is extracted from the ground. The biorenewable feedstock may comprise a nitrogen concentration of at least about 10 wppm, frequently at least about 25 wppm, suitably at least about 300 wppm, perhaps at least about 500 wppm and up to about 800 wppm nitrogen. The biorenewable feedstock may comprise about 1 to about 1000 wppm sulfur. Although the FIGURE depicts a single stage process for hydrotreating a feedstock, the process is equally applicable to a two stage or a multistage process for hydrotreating a feedstock. In accordance with an exemplary embodiment the present disclosure, the process for hydrotreating a feedstock may be a single stage process. In accordance with another exemplary embodiment the present disclosure, the process for hydrotreating a feedstock may be a two-stage process.

A variety of different biorenewable feedstocks may be suitable for the process 100. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may be a source of phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising Jatropha curcas (Ratanjot, Wild Castor, Jangli Erandi), Madhuca indica (Mohuwa), Pongamia *pinnata* (Karanji, Honge), calophyllum inophyllum, moringa oleifera and Azadirachta indica (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

Non-indigenous sulfur, such as comprising dimethyl disulfide, may be added to the biorenewable feed stream from a line 101. The biorenewable feed stream in feed line 102 flows from the feed surge drum 110 in line 111. The biorenewable feed stream in line 111 is injected with the non-indigenous sulfur in line 101. Thereafter, the biorenewable feed stream in line 111 is passed via a charge pump 104 and mixes with a feed hydrotreating hydrogen stream in line 182 to provide a mixed biorenewable feed stream in line 112. The mixed biorenewable feed stream in line 112 is heated by heat exchange with a combined hot hydrotreated vapor stream in line 145 to provide a heat exchanged biorenewable feed stream in line 113. The heat exchanged biorenewable feed stream in line 113 is mixed with a hot liquid recycle stream in a line 146 to provide a combined biorenewable feed stream in line 114. The recycle to feed rate may range from about 1:1 to about 5:1. The combined biorenewable feed stream 114 may be heated in a combined feed exchanger 21 by heat exchange with a hydrotreated stream in a hydrotreated line 134 and/or in a fired heater 116 to a guard inlet temperature.

A heated combined biorenewable feed stream in a combined feed line 118 is then charged to a hydrotreating reactor section 121. The feed stream is hydrotreated in the hydrotreating reactor section 121 in the presence of a hydrotreating hydrogen stream and a hydrotreating catalyst to provide a hydrotreated stream. In an exemplary embodiment, the hydrotreating reactor section 121 may comprise a guard bed reactor 120 followed by a hydrotreating reactor 130 or it may omit the guard bed reactor perhaps by installing a guard bed in the hydrotreating reactor 130. In an embodiment, the combined biorenewable feed stream is charged to the guard bed reactor 120 to be partially hydrotreated. The guard bed inlet temperature may range between about 218° C. (425° F.) and about 304° C. (580° F.). In the guard bed reactor 120, the combined biorenewable feed stream in the combined feed line 118 is hydrotreated in the presence of the hydrotreating hydrogen stream comprising hydrogen sulfide and a hydrotreating catalyst to hydrodeoxygenate the combined biorenewable feed stream to provide a hydrotreated stream. The hydrodeoxygenation reactions occurring in the guard bed reactor 120 include hydrodeoxygenation, hydrodecarbonylation and hydrodecarboxylation reactions. Additionally, other hydrotreating reactions may occur in the guard bed reactor 120 including olefin saturation, hydrodemetallation, which removes phosphorous, hydrodesulfurization and hydrodenitrification. The feed hydrotreating hydrogen stream in line 182 contains hydrogen sulfide, such that hydrogen sulfide is continuously supplied to the guard bed reactor 120 to maintain sulfidation of the hydrotreating catalyst and its activity.

The guard bed reactor and the hydrotreating reactor temperatures are kept low, less than about 343° C. (650° F.) for typical biorenewable feedstocks and less than about 304° C. (580° F.) for feedstocks with higher free fatty acid (FFA) concentration to avoid polymerization of olefins found in FFA.

The guard bed catalyst may comprise a base metal on a support. Base metals useable in this process include nickel, chromium, molybdenum and tungsten. In an aspect, the base metal can be molybdenum or nickel or both. Other base metals that can be used include tin, indium, germanium, lead, cobalt, gallium and zinc. The base metals are active in the sulfide form. Hydrogen sulfide is provided in the hydrotreating hydrogen stream in line 181 to the guard bed reactor 120 in the feed hydrotreating hydrogen stream in line 182 in the range of about 50 to about 2000 wppm and preferably, about 500 to about 1200 wppm, on a fresh feed basis. A suitable guard bed catalyst may include BGB-200 or BGB-100 available from UOP LLC. The biorenewable feedstock can be charged at pressures from 1379 kPa (abs) (200 psia) to 6895 kPa (abs) (1000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 30. Multiple guard beds may be contained in the guard bed reactor 120 such as 2, 3, 4 or more and a hydrogen quench from a guard bed hydrotreating hydrogen stream in line 184 may be injected at spaced or interbed locations to control temperature exotherms. Hydrogen is also provided to the guard beds in the guard bed reactor 120 from the guard bed hydrogen stream in line 184 from the hydrotreating hydrogen stream in line 181 by interbed quench injection. The guard bed hydrogen stream may have the same concentration as the feed hydrotreating hydrogen stream in line 182.

A contacted biorenewable feed stream is discharged from the guard bed reactor 120 in the contacted feed line 122 at a guard outlet temperature that is greater than the guard inlet temperature due to the predominant exothermic reactions that occur in the guard bed reactor 120. In the guard bed reactor 120, most of the hydrodemetallation and hydrodeoxygenation, including hydrodecarbonylation and hydrodecarboxylation, reactions will occur with some denitrogenation and desulfurization occurring. Metals removed include alkali metals and alkali earth metals and phosphorous.

The contacted biorenewable feed stream in the contacted feed line 122 may be heated and charged to the hydrotreating reactor 130. The hydrotreating reactor 130 may have a bed of hydrotreating catalyst to further hydrodemetallate, hydrodeoxygenate, including hydrodecarbonylate and hydrodecarboxylate, hydrodenitrogenate and hydrodesulfurize the contacted biorenewable feed stream. The heated, contacted biorenewable feed stream may be charged to the hydrotreating reactor 130 at a hydrotreating inlet temperature that may range from about 343° C. (650° F.) to about 400° C. (752° F.).

In the hydrotreating reactor 130, the heated, contacted biorenewable feed stream is contacted with a hydrotreating catalyst in the presence of a reactor hydrotreating hydrogen stream from line 186 at hydrotreating conditions to saturate the olefinic or unsaturated portions of the n-paraffinic chains in the biorenewable feedstock. The hydrotreating catalyst also catalyzes hydrodeoxygenation reactions including hydrodecarboxylation and hydrocarbonylation reactions to remove oxygenate functional groups from the biorenewable feedstock molecules which are converted to water and carbon oxides. The hydrotreating catalyst also catalyzes desulfurization of organic sulfur and denitrogenation of organic nitrogen in the biorenewable feedstock. Essentially, the hydrotreating reaction removes heteroatoms from the hydrocarbons and saturates olefins in the feed stream. The hydrotreating catalyst may be provided in one, two or more beds and employ interbed hydrogen quench streams from the hydrogen quench stream from the reactor hydrotreating hydrogen stream in line 186.

The hydrotreating catalyst may comprise nickel, nickel/molybdenum, or cobalt/molybdenum dispersed on a high surface area support such as alumina. Suitable hydrotreating catalysts include BDO 300 or BDO 400 available from UOP LLC in Des Plaines, Illinois. Hydrotreating catalyst should be in sulfided form. Hydrogen sulfide from the reactor hydrotreating hydrogen stream in line 38 may provide sulfur for catalyst sulfidation. The hydrogen sulfide concentration in the hydrotreating reactor may be higher than in the guard bed reactor due to hydrogen sulfide generated in the guard bed reactor 120 and transported to the hydrotreating reactor in line 122 in addition to the hydrogen sulfide provided in reactor hydrotreating hydrogen stream in line 186.

Generally, hydrotreating conditions include a pressure of about 700 kPa (100 psig) to about 21 MPa (3000 psig). The hydrotreating outlet temperature may range between about 343° C. (650° F.) and about 427° C. (800° F.).

In an embodiment, the hydrotreating reactor 130 may comprise a hydrotreating section 131 and a hydroisomerization section 132. The hydrotreating section 131 may comprise one or more beds of hydrotreating catalyst. Applicants have found that the amount of carbon oxide produced during the process varies from the start of the run (SOR) to the end of the run (EOR). Typically, the guard bed reactor 120 comprise a comparatively low activity catalyst compared to the hydrotreating reactor 130. So, at SOR, when the guard bed reactor 120 starts the deoxygenation reaction at a comparatively low temperature, the guard bed reactor 120 promotes hydrodeoxygenation reactions producing water over decarboxylation reactions which produce carbon dioxide due to the comparatively low activity catalyst present in the guard bed reactor 120. As the catalyst of the guard bed reactor 120 loses activity over time, the temperature of the guard bed reactor comparatively increases causing the deoxygenation reactions to shift to the hydrotreating section 131 in the hydrotreating reactor 130 wherein the hydrotreating catalyst has a comparatively higher activity than the catalyst in the guard bed reactor 120. The hydrotreating catalyst in the hydrotreating section 131 promotes decarboxylation. So, at the EOR the catalyst in the guard bed reactor 120 is almost fully spent and the hydrotreating section 131 is promotes decarboxylation. Therefore, more of carbon oxides like carbon monoxide and carbon dioxide are produced at the EOR.

A hydrotreated stream produced in the hydrotreating section 131 comprises a hydrocarbon fraction which has a substantial n-paraffin concentration. Oxygenate concentration in the hydrocarbon fraction is essentially nil, whereas the olefin concentration is substantially reduced relative to the contacted biorenewable feed stream. The organic sulfur concentration in the hydrocarbon fraction may be no more than 500 wppm and the organic nitrogen concentration in the hydrocarbon fraction may be less than 10 wppm. Although this hydrocarbon fraction is useful as a diesel fuel because it comprises a substantial concentration of n-paraffins from the biorenewable feedstock, it will have poor cold flow properties. The hydrotreated stream can be contacted with an isomerization catalyst under isomerization conditions to at least partially isomerize the n-paraffins to isoparaffins, as hereinafter described. The hydrotreated stream may be separated into a hydrotreated liquid stream and a hydrotreated gas stream.

In a two-stage configuration, the hydrotreated stream would have the hydrocarbon fraction separated from gas fraction in an enhanced hot separator with the hydrocarbon fraction forwarded to the hydroisomerization section 132. In a single stage configuration shown in the FIGURE, the hydrocarbon fraction and the gas fraction are sent to the hydroisomerization section 132 together.

To improve the cold flow properties, the hydrotreated stream may be contacted with a hydroisomerization catalyst in a hydroisomerization section 132 under hydroisomerization conditions to hydroisomerize the normal paraffins to branched paraffins. The hydrotreated liquid stream may be hydroisomerized over a hydroisomerization catalyst in the presence of the hydrotreating hydrogen stream provided by line 186.

The hydroisomerization, including hydrodewaxing, of the normal hydrocarbons in the hydroisomerization section 132 can be accomplished over one or more beds of hydrodewaxing catalyst, and the hydrodewaxing may be operated in a co-current mode of operation.

Suitable hydroisomerization catalysts may comprise a metal of Group VIII (IUPAC 8-10) of the Periodic Table being supported on a support material comprising a metal oxide, as well as a molecular sieve. Suitable Group VIII metals include platinum, palladium, and nickel each of which may be used alone or in combination. If the hydroisomerization catalyst is located in the hydrotreating reactor such as in the FIGURE, non-noble metals should be used which are not as susceptible to sulfur deactivation in a sour environment. Examples of suitable non-noble metals include Ni, Mo, Co, W, Mn, Cu, Zn or Ru. Mixtures of hydrogenation metals may also be used such as Co/Mo, Ni/Mo and Ni/W. The amount of hydrogenation metal or metals may range from 0.1 to 5 wt. %, based on the catalyst weight. Methods of loading metal onto the support material include, for example, impregnation of the support material with a metal salt of the hydrogenation component and heating. The catalyst support material containing the hydrogenation metal may also be sulfided prior to use.

The support material comprising a metal oxide may include alumina, silica, titania or silica-alumina or combinations of these. Suitable molecular sieve may include molecular sieve having a topology such as AEI, AEL, AFO, AFX, ATO, BEA, CHA, FAU, FER, MEL, MFI, MOR, MRE, MTT, MWW or TON topology such as EU-2, ZSM-11, ZSM-22, ZSM-23, SAPO-SAPO-11, SAPO-31, SAPO-34, SAPO-41, SSZ-13, SSZ-16, SSZ-39, MCM-22, zeolite Y, ferrierite, mordenite, ZSM-5 or zeolite beta, with the associated benefit of such materials being active in hydroisomerization of linear hydrocarbons. SAPO-11 was found of particular utility. SAPO-11, SAPO-31, and SAPO-41 are described in U.S. Pat. No. 4,440,871. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2$:$Al_2O_3$ ratio is higher than 300:1; (b) one or more metal(s) belonging to Group VIIIA, selected from platinum and palladium, in an amount comprised within the range of from 0.05 to 5% by weight. V. Calemma et al., App. Catal. A: Gen., 190 (2000), 207 teaches yet another suitable catalyst. Alumina or silica may be added to the support material.

DI-200, DI-211, and DI-100 available from UOP LLC in Des Plaines, Illinois may be used as a suitable hydroisomerization catalyst.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

The hydrodewaxing catalysts useful in processes according to the disclosure can be self-bound or include a binder. In some embodiments, the hydrodewaxing catalysts used in process according to the disclosure are formulated using a low surface area binder, a low surface area binder represents a binder with a surface area of 100 m$^2$/g or less, or 80 m$^2$/g or less, or 70 m$^2$/g or less, or 60 m$^2$/g or less, or 50 m$^2$/g or less, or 40 m$^2$/g or less, or 30 m$^2$/g or less.

Alternatively, the binder and the zeolite particle size are selected to provide a catalyst with a desired ratio of micropore surface area to total surface area. In hydrodewaxing catalysts used according to the disclosure, the micropore surface area corresponds to surface area from the unidimensional pores of zeolites in the hydrodewaxing catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and zeolite can contribute to the value of the external surface area. Preferably, the ratio of micropore surface area to total surface area for a hydrodewaxing catalyst will be equal to or greater than 25%, or equal to or greater than 30%, or equal to or greater than 35%, or equal to or greater than 40%.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 2.7 wt %, or 0.2 to 2 wt %, or 0.3 to 1 wt %.

In yet another embodiment, a binder composed of two or more metal oxides can also be used. In such an embodiment, the weight percentage of the low surface area binder is preferably greater than the weight percentage of the higher surface area binder.

Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

In one form the of the present disclosure, the catalytic hydrodewaxing catalyst includes from 0.1 wt % to 2.7 wt % framework alumina, 0.1 wt % to 5 wt % Pt, 200:1 to 30:1 SiO$_2$:Al$_2$O$_3$ ratio and at least one low surface area, refractory metal oxide binder with a surface area of 100 m$^2$/g or less.

Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

A hydrotreated stream in a hydrotreated line 133 from the isomerization section 132 is a branched-paraffin-rich stream that preferably comprises greater than 50 mass-% branched paraffins of the total paraffin content. It is envisioned that the hydroisomerized effluent may contain 70, 80, or 90 mass-% branched paraffins of the total paraffin content. Only minimal branching is required, enough to improve the cold-flow properties of the hydrotreated stream to meet specifications. Hydroisomerization conditions are selected to avoid undesirable cracking, so the predominant product in the hydroisomerized effluent in the hydrotreated line 133 is a mono-branched paraffin.

The hydrotreated stream in line 133 comprises hydrogen, hydrogen sulfide and carbon oxides in addition to the hydrocarbons. The hydrotreated stream in the hydrotreated line 133 may first flow to a hydrotreated effluent heat exchanger 31 to heat the cold hydrotreated liquid stream in the cold hydrotreated liquid line 156 and cool the hydrotreated stream. As previously described, the cooled hydrotreated stream in the hydrotreated line 133 may then be heat exchanged with the combined biorenewable feed stream in the combined feed effluent exchanger 21 to cool the hydrotreated stream in the hydrotreated line 133 and heat the combined biorenewable feed stream in line 114. A cooled hydrotreated steam in the hydrotreated line 134 may be then further cooled in the steam generator 135 to generate steam. In the steam generator 135, the hydrotreated steam in the hydrotreated line 134 is further cooled by heat exchange with a water stream in line 136 and provides steam in line 137.

A further cooled hydrotreated stream may be withdrawn in line 138 from the steam generator 135. The cooled hydrotreated stream in line 138 may be passed to a hot separator 140. The cooled hydrotreated stream may be separated in the hot separator 140 to provide a hydrocarbonaceous, hot hydrotreated gas stream in a hot overhead line 142 and a hydrocarbonaceous, hot hydrotreated liquid stream in a hot bottoms line 141. The hot separator 140 may be in downstream communication with the hydrotreating reactor 130. The hot separator 140 operates at about 177° C. (350° F.) to about 371° C. (700° F.) and preferably operates at about 232° C. (450° F.) to about 315° C. (600° F.). The hot separator 140 may be operated at a slightly lower pressure than the hydrotreating reactor 130 accounting for pressure drop through intervening equipment. The hot separator 140 may be operated at pressures between about 3.4 MPa (gauge) (493 psig) and about 20.4 MPa (gauge) (2959 psig). The hot hydrotreated vapor stream in the hot overhead line 142 may have a temperature of the operating temperature of the hot separator 140.

The hot liquid stream in the hot bottoms line 141 may be pumped via pump 143 and split into two streams: a process liquid stream in a process line 144 taken from the hot liquid stream in the hot bottoms line 141 and the hot recycle liquid stream in the recycle line 146 also taken from the hot hydrotreated liquid stream in the hot bottoms line 141. The hot recycle liquid stream in the recycle line 146 may be combined with the biorenewable feed stream in line 102 as previously described.

The process liquid stream taken from the hot liquid stream in the process line 144 may mixed with the hot hydrotreated vapor stream in the hot overhead line 142 to provide a combined hot hydrotreated vapor stream in line 145 and cooled by heat exchange with the mixed biorenewable feed stream in line 112 in the hot vapor combined feed heat exchanger 11. The cooled combined hot hydrotreated vapor stream in line 145 may be further cooled and fed to a cold separator 150. The cooled combined hot hydrotreated vapor stream is separated in the cold separator 150 into a cold hydrotreated vapor stream in a cold overhead line 152 comprising hydrogen sulfide, carbon oxides, hydrogen and light $C_1$-$C_6$ hydrocarbons. The hot hydrotreated liquid stream in the combined hot hydrotreated vapor stream in line 145 sponges hydrotreated liquid materials in the vapor to draw them into the cold hydrotreated liquid stream. An aqueous stream can be withdrawn from a boot in the cold separator 150. The cold hydrotreated liquid stream exits the cold separator 150 in a cold bottoms line 156. The cold hydrotreated liquid stream comprises distillate range hydrocarbons and is heated by heat exchange with the stripper bottoms stream in a stripper bottoms line 221 in the stripper bottoms exchanger 41 and the hydrotreated stream in the hydrotreated effluent exchanger 31 and is fed to product recovery section 201. In an exemplary embodiment, the product recovery section comprises a stripper column or stripper 220, a sponge absorber column 230, a fractionation column 250, a caustic scrubber unit 270, a selective caustic scrubber unit 260, and a thermal oxidation unit 280.

In the stripper column 220, vaporous components such as hydrogen sulfide are stripped from the hydrotreated liquid stream by contact with a stripping gas such as steam fed by line 212 to a bottom of the stripper column 220. The vaporous components will separate into an overhead gaseous stream and ascend into an overhead line 222. The overhead gaseous stream in the overhead line 222 may be condensed to produce a naphtha stream in a stripper overhead liquid stream in line 224 while leaving liquefied petroleum gas (LPG) containing primarily $C_3$ and $C_4$ hydrocarbons and light gases in a stripper off-gas stream in a line 227. A condensed overhead gaseous stream may be passed to a stripper column receiver 223 to provide the stripper off-gas stream in line 227 and the stripper overhead liquid stream in line 224. The stripper overhead liquid stream in line 224 may be fractionated in the fractionator 250. In an embodiment, a reflux stream may be withdrawn from the stripper overhead liquid stream in line 224. The reflux stream withdrawn in line 225 is recycled to the top of the fractionator 250. A remaining portion of the stripper overhead liquid stream in line 226 is passed to the fractionation column 250. A stripped distillate stream may leave the stripper column 220 in the stripper bottoms line 221. The stripped distillate stream can be recovered as diesel product in line 221 or transported to further product recovery. Further fractionation of the stripped distillate stream in the stripper bottoms line 221 can produce kerosene/jet range stream and a diesel range stream.

The cold hydrotreated vapor stream in the cold separator overhead line comprises hydrogen, hydrogen sulfide, carbon dioxide, carbon monoxide, and light $C_1$-$C_6$ hydrocarbons. Typically, this cold hydrotreated vapor stream is fed to a scrubber column which contacts the cold hydrotreated vapor stream with an amine solvent to scrub the cold hydrotreated vapor stream of acid gases, so the purified cold hydrotreated vapor stream can be recycled to the hydrotreating section 121 and particularly to the guard bed reactor 120 and/or the hydrotreating reactor 130 to provide hydrogen requirements. Carbon dioxide is an acid gas that is desirably removed from the cold hydrotreated vapor stream before recycling it to the hydrotreating section 121 and particularly to the guard bed reactor 120 and/or the hydrotreating reactor 130. Carbon dioxide can build up in the system and must be removed. Additionally, carbon monoxide is controlled by converting it in a water gas shift reaction to carbon dioxide in the hydrotreating reactor 130. Carbon dioxide concentration has to be controlled to avoid pushing the water gas shift equilibrium too much in favor of carbon monoxide which is not easily removed from the system.

Another acid gas, hydrogen sulfide, is retained in the cold hydrotreated vapor stream that is recycled to the hydrotreating section 121 and particularly to the guard bed 120 and/or the hydrotreating reactor 130. Hydrogen sulfide is necessary to replenish sulfur that is stripped from the hydrotreating metals on the hydrotreating catalyst. Sulfur is necessary to keep the hydrotreating metals sulfided and therefore, active. Conventionally, the entire cold hydrotreated gas stream is subjected to scrubbing with a solvent to remove acid gases before any part of it is recycled to the hydrotreating section 121 and particularly to the guard bed reactor 120 and/or the hydrotreating reactor 130. In an embodiment, a portion of the cold hydrotreated gas stream is bypassed around an acid gas removal column and recycled to the hydrotreating section 25 and particularly to the guard bed reactor 30 and/or the hydrotreating reactor 32 with all of its hydrogen sulfide.

In accordance with the present process, the cold hydrotreated gas stream in the cold overhead line 152 is split into a recycle gas stream in a recycle line 154 and a purge gas stream in a purge line 153. The recycle gas stream in the recycle line 154 is recycled to the hydrotreating section 121 and particularly to the guard bed reactor 120 and/or the hydrotreating reactor 130 with all of its hydrogen sulfide. A supplemented make-up hydrogen gas stream in line 175 may be added to the recycle gas stream in line 154 to provide a recycle hydrogen stream in line 176. The recycle hydrogen stream is compressed in a compressor 180 to provide the hydrotreating hydrogen stream in line 181 that is recycled to the hydrotreating section 121 and particularly to the guard bed reactor 120 and/or the hydrotreating reactor 130. The supplemented make-up hydrogen gas stream in line 175 has a greater concentration of hydrogen than the recycle gas stream to boost the hydrogen concentration of the hydrotreating hydrogen stream recycled to the hydrotreating section 121 and particularly to the guard bed reactor 120 and/or the hydrotreating reactor 130.

The hydrotreating hydrogen stream in line 181 comprises at least a portion of the cold hydrotreated gas stream in line 152 and the recycle gas stream in line 154. In accordance with an exemplary embodiment, the hydrotreated hydrogen stream in line 181 may comprise from about 50 wppm sulfur to about 2000 wppm sulfur, or at least 50 wppm hydrogen sulfide to about 2000 wppm hydrogen sulfide. In accordance with another exemplary embodiment the hydrotreated hydrogen stream in line 181 may comprise from about 100 wppm sulfur to about 1500 wppm sulfur or at least about 100 wppm to about 1500 wppm hydrogen sulfide. In accordance with yet another exemplary embodiment, the hydrotreated hydrogen stream in line 181 will comprise at least 400 wppm to about 1000 wppm sulfur or about 400 to about 1000 wppm hydrogen sulfide.

The purge gas stream in line 153 may comprise about 1 to about 50 wt %, and preferably about 5 to about 25 wt %, of the cold hydrotreated gas stream in line 152. In an aspect, the purge gas stream may be about 5 to about 15 wt % of the cold hydrotreated gas stream in line 152. The balance of the cold hydrotreated gas stream may be the recycle gas stream in line 154. The amount of the purge gas stream can be selected to ensure that the concentration of carbon monoxide in the hydrotreating hydrogen stream is below about 1 wt % or below about 2 wt %. Sometimes at the SOR, withdrawal of the purge stream in line 153 may not be required. Further, the amount of the purge stream withdrawn in line 153 may increase towards the EOR. So, including the scenario of SOR, the purge gas stream in line 153 may comprise from about 0 to about 50 wt % of the cold hydrotreated gas stream in line 152.

The purge gas stream in the purge gas line 153 may be purified in a purification unit 160 to increase a hydrogen concentration of the purge gas stream. In an exemplary embodiment, the purification unit 160 includes a solid media purification unit 161. The purge gas stream in the purge gas line 153 may be purified in the solid media purification unit 161 by contact with a solid media to remove impurities from the purge gas stream to provide a contacted purified gas stream. The solid media purification unit 161 utilizes a solid media to remove impurities from the purge gas stream in line 153.

The solid media purification unit 161 is preferably a pressure swing adsorption (PSA) unit 164. The purge gas stream in line 153 may be directly fed to the PSA unit 161 in which hydrogen passes by the adsorbent in a plurality of beds 165 while larger molecules such as impurities, carbon monoxide, carbon dioxide, hydrogen sulfide and hydrocarbons, adsorb onto the adsorbent in the beds.

The exemplary PSA unit 161 operates on the principle of selectively adsorbing hydrocarbons and impurities, such as carbon monoxide, hydrogen sulfide and/or nitrogen, onto the adsorbent at a relatively high pressure, such as about 1,920 to about 5,520 kPa gauge to form the contacted purified gas stream 166, and desorbing the hydrocarbons and impurities from the adsorbent at relatively low pressure, such as about 7 to about 840 kPa gauge to regenerate the adsorbent and to form a tail gas impurity rich stream 168 that contains the hydrocarbons and/or other impurities, such as carbon monoxide and hydrogen sulfide.

In an exemplary embodiment, the PSA unit 161 includes a plurality of fixed adsorbent beds 165 containing the solid media which is the adsorbent. Each adsorbent bed 165 contains layers of different adsorbent materials where a lower layer or layers are filled with weaker adsorbent materials that have relatively low affinity for adsorbing gaseous hydrocarbons, and an upper layer or layers are filled with stronger adsorbent materials that have a relatively high affinity for adsorbing gaseous hydrocarbons and impurities. For example, the lower layer(s) can contain weakly adsorbent materials, such as activated alumina and/or silica gel, while the intermediate layer(s) can contain intermediate strength adsorbent materials, such as activated carbon, and the upper layer(s) can contain strong adsorbent materials, such as zeolite and/or molecular sieve materials.

In an exemplary embodiment, the PSA unit 161 operates following a five-step pressure-swing cycle including an adsorption step, a co-current depressurization step, a counter-current depressurization step, a purge step, and a repressurization step. The adsorbent beds 165 may be connected in series to cycle between pressures. During the adsorption step, the purge gas stream in line 153 enters a lower portion of the fixed-bed adsorption unit at a relatively high pressure, and as the feed gas rises in the unit, the hydrocarbons and impurities (e.g., carbon monoxide and/or hydrogen sulfide) are adsorbed in the various layers of the adsorbent materials depending upon their respective adsorption selectivity to form the contacted purified gas stream in line 166. The co-current depressurization, counter-current depressurization and purge steps decrease the pressure in the fixed-bed adsorption unit and purge the unit with high purity gas from the contacted purified gas stream in line 166 or co-current depressurization steps, respectively, to remove the hydrocarbons and impurities and regenerate the adsorption materials. Flow to each adsorbent bed 165 is periodically terminated and the pressure in the terminated bed is decreased in stages to release void space gas and then to blow down. A blow down pressure of about 7 kPa (1 psig) to about 840 kPa (120 psig) may be used to desorb hydrogen from the adsorbent. Depressurization or blow down desorbs adsorbed impurities from the adsorbent in the bed and pass it into the tail gas impurity rich stream in line 168. The repressurization step increases the pressure in the fixed-bed adsorption unit with either feed gas from the purge gas stream in line 153 or contacted purified gas stream in line 166 in preparation for the next adsorption step. Other pressure swing adsorption configurations may be used.

In an exemplary embodiment, at a blow down pressure of about 689 kPa (100 psig) to about 1034 kPa (150 psig) about 70 to about 75 mol % hydrogen recovery can be achieved from the purge gas stream 153 fed to the PSA unit 164. As a result, the tail gas impurity rich stream in line 168 exits at a pressure that enables it to enter the product recovery section 201. To maximize hydrogen recovery, the tail gas impurity rich stream in line 168 would be taken at even lower blowdown pressure such as at about 7 kPa (1 psig) to about 35 kPa (5 psig) to obtain at least about 92 mol % of the hydrogen in the purge gas stream 153 at a purity of about 90 to about 99 mol %. The low pressure of the tail gas enables greater removal of light hydrocarbons such as LPG and naphtha in the tail gas impurity rich stream from the purge gas stream. In an embodiment, a tail gas compressor (not shown) may be installed on the tail gas impurity rich line 168 to improve the recovery of LPG and naphtha in the product recovery section 201.

The impurity rich stream rich in carbon oxides, hydrogen sulfide and light hydrocarbons exits the PSA unit 164 in the tail gas stream in line 168. In accordance with the present disclosure, the tail gas stream in line 168 may be passed to the product recovery section 201 for recovery of hydrocarbons. The tail gas stream in line 168 may be passed to one or more of the stripper column 220, the sponge absorber column 230, or the selective caustic scrubber unit 260. In an exemplary embodiment, the tail gas stream in line 168 may be passed to the sponge absorber column 230.

The PSA unit 161 produces a contacted purified gas stream in a purified gas line 166. The contacted purified gas stream in line 166 may be mixed with the recycle gas stream in line 154 to increase the hydrogen concentration in the recycle gas stream recycled to the hydrotreating section 121 and particularly to the guard bed reactor 120 and/or the hydrotreating reactor 130. The contacted purified gas stream in line 166 may have at least 98 mol % hydrogen, suitable at least 99 mol % hydrogen and preferably at least 99.9 mol % hydrogen at 3.5 MPa (500 psia) to about 5.5 MPa (800 psia). In an aspect, the contacted purified gas stream in line 166 may supplement a make-up gas stream in line 174 which has a similar hydrogen concentration and pressure. The make-up gas in line 174 may be provided from the make-up gas header in line 162 and undergo one or two stages of compression before it is supplemented with the contacted purified gas stream in line 166 to provide the supplemented make-up gas stream in line 175. The supplemented make-up gas stream in line 175 may then be mixed with the recycle gas stream in line 154 and compressed in the recycle gas compressor to provide the hydrotreating hydrogen stream in line 181. In an aspect, the make-up gas stream in line 174 is mixed with the purified gas stream in line 166 and the recycle gas stream in line 154 to provide the recycle hydrogen stream in line 176.

The hydrotreating hydrogen stream in line 181 may be provided in three branches: a feed hydrotreating hydrogen stream in line 182, a guard bed hydrotreating hydrogen stream in line 184 and a reactor hydrotreating hydrogen stream in line 186. The hydrotreating hydrogen stream comprises at least 60 wt % hydrogen, suitably at least 80 wt % hydrogen, more suitably at least 92 wt % hydrogen, preferably at least 94 wt % hydrogen, and less than 1 mol % carbon monoxide and hydrogen sulfide as previously stated to maintain sulfidation of the hydrotreating catalyst in the guard bed reactor 120 and the hydrotreating reactor 130 in the hydrotreating reactor section 121. The hydrogen sulfide in the recycle hydrogen stream in line 176 recycled to the reactor permits reduction or elimination of any sulfur addition into the biorenewable feed stream 102.

The compressed hydrotreating hydrogen stream in line 181 supplies hydrogen to the hydrotreating hydrogen stream in the hydrotreating hydrogen line 182, the guard bed hydrogen stream in the guard bed hydrogen line 184 and the reactor hydrogen stream in the reactor hydrogen line 186. The greater the proportion of the purge gas stream in line 153 relative to the recycle gas stream in line 154 results in a greater proportion of supplemented make-up gas that must be mixed with the recycle gas and recycled to the hydrotreating section 121 and particularly to the guard bed reactor 120 and/or the hydrotreating reactor 130. However, the use of a solid media gas purification unit 161 to increase the hydrogen purity of the purge gas stream enables reduction of the make-up gas rate in line 174 to the extent that the contacted purified gas stream in line 166 provides make-up gas in line 175 to be mixed with the recycle gas in line 154.

Referring to the stripper column 220, the stripper off-gas stream in line 227 may be passed to a sponge absorber column 230 for recovering hydrocarbons comprising LPG range $C_{3+}$ hydrocarbons. A fractionator off-gas stream in line 252 may also be passed to the sponge absorber column 230. In an exemplary embodiment, the stripper off-gas stream in line 227 may be combined with the fractionator off-gas stream in line 252 to provide a combined off-gas stream in line 228. The combined off-gas stream in line 228 may be passed to the sponge absorber column 230. In another embodiment, the stripper off-gas stream in line 227 and the fractionator off-gas stream in line 252 may be passed to the absorber column 230 separately. The tail gas stream in line 168 is also passed to the absorber column 230 perhaps above the combined off-gas stream in line 228. In the sponge absorber column 230, the stripper off-gas stream in line 227, the fractionator off-gas stream in line 252, and the tail gas stream in line 168 are contacted with a sponge oil stream passed via line 258 into the sponge absorber column 230. A LPG hydrocarbons-rich sponge oil stream is withdrawn from the bottoms of the sponge absorber column 230 in a bottoms line 234. A sponge off-gas stream comprising one or more of hydrogen sulfide, water, and carbon dioxide may be withdrawn from the overhead of the sponge absorber column 230 in an overhead line 232. At least a portion of the sponge off-gas stream may be contacted with a caustic stream to provide a sulfur-lean sponge off-gas stream and a sulfur-rich caustic stream. In an exemplary embodiment, the sponge off-gas stream in line 232 may be passed to a knock-out drum 240 to further separate light gases from the sponge off-gas stream in an overhead lean stream in line 242. A liquid stream may be withdrawn from the knock-out drum 240 in a bottoms line 244.

In accordance with the current process, the stripper overhead liquid stream in line 226, the LPG hydrocarbons rich sponge oil stream in line 234, and the liquid stream in the bottoms line 244 may be fractionated in the fractionation column 250. In an exemplary embodiment, the stripper overhead liquid stream in line 226 and the LPG hydrocarbons rich sponge oil stream in line 234 may be combined to provide a first combined stream in line 236 which may be passed to the fractionator 250. In another exemplary embodiment, first combined stream in line 236 and the liquid stream in the bottoms line 244 may be combined to provide a second combined stream in line 246 which may be passed to the fractionation column 250. The stripper overhead liquid stream in line 226, the LPG hydrocarbons rich sponge oil stream in line 234, and the liquid stream in the bottoms line 244 may be passed separately to the fractionation column 250. The stripper overhead liquid stream in line 226, the LPG hydrocarbons rich sponge oil stream in line 234, and the liquid stream in the bottoms line 244 are fractionated in the fractionation column 250 to provide a fractionator overhead gaseous stream in line 251 and a fractionator bottoms naphtha stream in line 257. The fractionator overhead gaseous stream may be condensed and passed to fractionator receiver 253 to separate the fractionator off-gas stream in line 252 from a liquid stream comprising LPG hydrocarbons in line 254. The fractionator off-gas stream in line 252 may be recycled to the sponge absorber column 230 as previously indicated. The liquid stream comprising LPG hydrocarbons in line 254 is separated into a first portion of the liquid stream comprising LPG hydrocarbons in line 255 and a second portion of the liquid stream comprising LPG hydrocarbons in line 256. The second portion of the liquid stream may be passed to the top of the fractionator 250 as reflux stream in line 256. The fractionator bottoms naphtha stream in line 257 may be split into a fractionator boilup stream in a fractionator reboil line 291 and a net fractionator bottoms naphtha stream in line 290. The fractionator boilup stream in a fractionator reboil line 291 is returned to the fractionator 250 after reboiling in a reboiler 51. In an embodiment, the net fractionator bottoms naphtha stream in line 290 may be separated into a bottoms naphtha product stream in line 259 and a bottoms naphtha recycle stream in line 258. In an exemplary embodiment, bottoms naphtha recycle stream may be passed to the sponge absorber column 230 as sponge oil in line 258. In another embodiment, the stripped distillate stream in the stripper bottoms line 221 may be passed to the sponge absorber column 230 as sponge oil in line 258.

The liquid stream comprising LPG hydrocarbons in line 256 and the sponge off-gas stream in line 242 comprise, inter alia, carbon oxides and hydrogen sulfide. These streams may be further purified to separate carbon oxides and/or hydrogen sulfide to recover purified/treated gas streams. In accordance with the present process, the liquid stream comprising LPG hydrocarbons in line 255 and the sponge off-gas stream in line 242 are contacted with caustic (NaOH) in their respective caustic scrubber to separate carbon oxides and/or hydrogen sulfide to recover purified/treated gas and liquid streams. In a typical caustic treatment, a single caustic treatment step contacts the gas streams with a caustic stream. Such a treatment step contacts a batch of caustic with the gas streams. When the caustic begins to consume recoverables from the gas stream, a spent caustic is flushed out and replaced with a new batch of caustic. This treatment step would require a large vessel for contacting the gas streams with caustic stream. Also, the volume of caustic contacted with the gas stream is significantly higher and produces large volumes of spent caustic which must be treated/handle properly.

Applicants have found that the sponge off-gas stream in line 242 has a comparatively higher hydrogen sulfide to carbon dioxide mole ratio as compared to the liquid stream comprising LPG hydrocarbons in line 255. Particularly, the amount of hydrogen sulfide present in the sponge off-gas stream in line 242 is comparatively higher than in the liquid stream comprising LPG hydrocarbons in line 255. The disclosed process comprises a selective caustic treatment step for the sponge off-gas stream in line 242. The selective caustic treatment step for the sponge off-gas stream in line 242 selectively removes sulfur from the sponge off-gas stream, particularly hydrogen sulfide, more than the carbon dioxide. To ensure the selective removal of sulfur from the sponge off-gas stream, the sponge off-gas stream in line 242 is contacted with a caustic stream in the selective caustic scrubber unit 260 for a very short contact time. The contact time for the selective caustic can be alternately called as the residence time for the selective caustic scrubber unit 260. The caustic treatment for the liquid stream comprising LPG hydrocarbons in line 255 can be a batch method. The disclosed process with the selective caustic treatment for sulfur removal reduces the overall capital expense of the process by reducing the size of the selective caustic scrubber unit for the sponge off-gas stream in line 242. Since the present process employs selective caustic treatment for the sponge off-gas stream in line 242 in the selective caustic scrubber unit 260, the spent caustic generated after treating the sponge off-gas stream in line 242 is reduced. Thus, the total volume of the spent caustic from the selective caustic scrubber unit 260 and the caustic scrubber unit 270 is reduced. The present process also provides an efficient and environmentally friendly spent caustic treatment method described hereinafter in detail to produce a treated gas stream.

In an exemplary embodiment, the sponge off-gas stream in line 242 may be split into a first portion in line 247 and a second portion in line 248 of the sponge off-gas stream. The first portion of the sponge off-gas stream in line 247 is contacted with a caustic stream in line 261 in the selective caustic scrubber unit 260. In the selective caustic scrubber unit 260, the caustic stream in line 261 selectively removes sulfur from the first portion of the sponge off-gas stream in line 247 over the carbon dioxide. In accordance with an exemplary embodiment of the present process, the first portion of the sponge off-gas stream in line 247 is contacted with the caustic stream in line 261 for a time period ranging from about 2 milliseconds to about 2 seconds to selectively remove sulfur from the first portion of the sponge off-gas stream to provide a sulfur-lean sponge off-gas stream 262 and a sulfur-rich spent caustic stream in line 264. The sulfur-lean sponge off-gas stream may be withdrawn in line 262. A short contact time between the sponge off-gas stream in line 247 and the caustic stream in line 261 in the selective caustic scrubber unit 260 ensures no or a substantially low carbon dioxide is transferred to the caustic stream while removing hydrogen sulfide into the caustic stream. In an exemplary embodiment, the caustic stream in line 261 can selectively remove at least 99 wt % of the hydrogen sulfide in the sponge off-gas stream in line 247 in the selective caustic scrubber unit 260 removes hydrogen sulfide in an amount from about 5000 wppm to about 50 wppm from the sponge off-gas stream in line 247. In accordance with another exemplary embodiment of the present disclosure, the sulfur-lean sponge off-gas stream 262 may comprise less than 50 wppm hydrogen sulfide. No or a substantially low carbon dioxide transfer avoids operating issues including sodium carbonate formation and plugging for the selective caustic scrubber unit 260 and also minimizes unnecessary caustic usage. Thus, the process requires a comparatively low volume of caustic and selectively removes sulfur from the sponge off-gas stream in line 247. In accordance with the present process, the selective caustic scrubbing can reduce caustic consumption by a factor in the range of about 4 to about 60 as compared to an unselective conventional process. The selective caustic scrubbing for the sponge off-gas stream in line 247 provides an advantage of lower capital expense for caustic scrubbing compared to an amine system. In an exemplary embodiment of the present disclosure, the caustic stream in line 261 may be passed at a flow rate from about 45 kg/hr (100 lb/hr) to about 454 kg/hr (1000 lb/hr) to the selective caustic scrubber unit 260 to selectively remove the sulfur from the first portion of the sponge off-gas stream in line 247. The caustic stream in line 261 may comprise a caustic solution having a concentration from about 5 wt % to about 15 wt % or a caustic solution having a concentration from about 6 wt % to about 12 wt %. In the selective caustic scrubber unit 260, the caustic from caustic stream in line 261 may react with the hydrogen sulfide present in the sponge off-gas stream in line 247 and produce sulfides and bisulfides of sodium. The produced sulfides and bisulfide of sodium will remain in the sulfur-rich spent caustic stream in line 264. In an exemplary embodiment, the sulfur-rich spent caustic stream in line 264 may comprise sodium sulfides and/or sodium bisulfide in an amount from about 4 wt % to about 8 wt %. The amount of sodium carbonates and/or bicarbonates in the sulfur-rich spent caustic stream in line 264 would expected to be minimal.

Referring back to the fractionator 250, the first portion of the liquid stream comprising LPG hydrocarbons in line 255 may be contacted with a caustic stream in line 271 in the caustic scrubber unit 270. The first portion of the liquid stream comprising LPG hydrocarbons in line 255 may be purified in the caustic scrubber unit 270 to provide a sulfur-lean LPG stream 272 and a spent caustic stream in line 274. The caustic treatment step for the liquid stream comprising LPG hydrocarbons in line 255 in the caustic scrubber unit 270 may not be a selective caustic treatment for sulfur removal as employed for the sponge off-gas stream in line 247. The caustic stream in line 271 when contacted with the first portion of the liquid stream comprising LPG hydrocarbons in line 255 removes inter alia carbon dioxide and hydrogen sulfide from the liquid stream 255 in the spent caustic stream in line 274. In an exemplary embodiment, caustic stream in line 271 can remove at least 99.9 wt % of the carbon dioxide in the liquid stream comprising LPG hydrocarbons in line 255 in the spent caustic stream in line 274. In another exemplary embodiment, the caustic stream in line 271 can remove at least 99 wt % of the hydrogen sulfide from the liquid stream comprising LPG hydrocarbons in line 255. In accordance with another exemplary embodiment of the present disclosure, the sulfur-lean LPG stream 272 may comprise no more than 10 wppm hydrogen sulfide and no more than 10 wppm carbon dioxide. The sulfur-lean LPG stream is withdrawn in line 272. Thus, both the spent caustic stream in line 274 and the sulfur-rich spent caustic stream in line 264 removes sulfur from the gas streams. Accordingly, the spent caustic stream in line 274 can also be termed as sulfur-rich spent caustic stream in line 274. However, the sulfur-rich spent caustic stream in line 264 comprises a comparatively higher concentration of removed hydrogen sulfide than the spent caustic stream in line 274.

The present process also discloses spent caustic treatment steps for an efficient and environment friendly handling and disposal of the spent caustic streams with reduced disposal costs. The caustic treatment steps of the present process convert the spent caustic streams into solid sulfur products/salts and provide a treated gas stream. In accordance with the present process, the sulfur-rich spent caustic stream in line 264 and the spent caustic stream in line 274 may be passed to and treated in a thermal oxidation unit 280.

In the caustic scrubber unit 270, the caustic of the caustic stream in line 271 may react with the hydrogen sulfide present in the liquid stream comprising LPG hydrocarbons in line 255 and produce sulfide and bisulfide of sodium. The produced sulfides and bisulfides of sodium will remain in the spent caustic stream in line 274. The spent caustic stream in line 274 comprises sodium sulfide, sodium bisulfide, and sodium carbonate. Since, caustic scrubbing in the caustic scrubber unit 270 is a non-selective caustic scrubbing, the caustic while reacting with the hydrogen sulfide also reacts with carbon dioxide to produce sodium carbonate. The spent caustic stream in line 274 may also comprise unreacted caustic, water, and trace amounts of hydrocarbons mainly C3, C4 dissolved in liquid phase. In an exemplary embodiment, the spent caustic stream in line 274 may comprise sodium sulfide and/or sodium bisulfide in an amount from about 4 wt % to about 8 wt %.

The composition of the sulfur-rich spent caustic stream in line 264 is similar to the spent caustic stream in line 274 with one key difference that it may contains no or very minimal amount of sodium carbonate due to the selective scrubbing in the selective caustic scrubber unit 260. In the selective caustic scrubber unit 260, there would be little or no reaction of caustic with the carbon dioxide due to very short contact time between the first portion of the sponge off-gas stream in line 247 and the caustic stream in line 261. So, caustic has sufficient time only to react with the hydrogen sulfide and not the carbon dioxide to produce sodium carbonate. The sulfur-rich spent caustic stream in line 264 may also have trace amounts of $C_1$ and $C_2$ hydrocarbons dissolved in the liquid phase.

The thermal oxidation unit, 280 comprises a thermal oxidation section, a quench section, and a scrubbing section. The thermal oxidation unit 280 may optionally comprise a nitrogen oxide removal section. The sulfur-rich spent caustic stream in line 264 and the spent caustic stream in line 274 are passed to the thermal oxidation section. A hydrocarbonaceous gas stream is also passed as a fuel gas to the thermal oxidation section of the thermal oxidation unit 280. In an exemplary embodiment, the second portion of the sponge off-gas stream in line 248 may be passed as the fuel gas to the thermal oxidation section of the thermal oxidation unit 280. An air stream in line 249 is also passed to the thermal oxidation section. The sulfur-rich spent caustic stream in line 264 and the spent caustic stream in line 274 are thermally oxidized in the thermal oxidation section of the thermal oxidation unit 280. The thermal oxidation of the sulfur-rich spent caustic stream in line 264 and the spent caustic stream in line 274 is performed at a temperature from about 800° C. to about 1300° C. with a residence time between 0.5 and 2 seconds.

The sodium ions react with carbon dioxide ($CO_2$) and oxygen ($O_2$) from the combustion of the hydrocarbons to form sodium oxide, and carbonate particulates, including, but not limited to, $Na_2O$, $Na_2CO_3$ and $NaHCO_3$ (and its hydrates). The $NaHCO_3$ may be further converted to $Na_2CO_3$. The sulfides from the spent caustic feed are converted to oxidized sulfur particulates including, but not limited to, $SO_2$ and $SO_3$. The formed flue gases flow to the quench section where the temperature of the flue gas stream is reduced. In the quench section, a quench media is passed to reduce the temperature of the flue gas stream. Suitable quench media may include air, water, or a suitable gas stream.

The sulfur oxidation unit can include an optional waste heat recovery section having a waste heat boiler to produce steam or a hot oil by recovering heat from the flue gas stream.

Thereafter, a flue gas stream from the thermal oxidation section is passed to a scrubbing section. The scrubbing section may be termed as a sulfur oxide removal section for the flue gas stream from the thermal oxidation section. In accordance with the present process, the scrubbing section can remove sulfur oxides above the acid and water dew point known as dry scrubbing or below the acid and water dew point known as wet scrubbing. For dry scrubbing one or more of the following scrubbing reagents can be used: sodium bicarbonate ($NaHCO_3$), $NaHCO_3Na_2CO_3 \cdot 2(H_2O)$, calcium carbonate ($CaCO_3$), calcium hydroxide ($Ca(OH)_2$), and magnesium hydroxide ($Mg(OH)_2$). For the dry scrubbing, the flue gas stream is first cooled to a temperature above acid and water dew point. The requirement of cooling to a temperature above acid and water dew point is due to design temperature of the filter systems used to separate the solid particles which may get formed during the dry scrubbing of the flue gas stream. In the dry scrubbing of the flue gas stream when the flue gas contacts with the scrubbing reagent any of the following sulfur oxides scrubbing products may produce: sodium carbonate ($Na_2CO_3$), sodium sulfate ($Na_2SO_4$), calcium sulphate ($CaSO_4$), calcium carbonate ($CaCO_3$), magnesium carbonate ($MgCO_3$), magnesium sulphate ($MgSO_4$). Thus, dry scrubbing of the flue gas stream can produce one or more of sodium, magnesium or calcium salts. Under certain circumstances, a thermal decomposition of the scrubbing reagents may also take place during the dry scrubbing of the flue gas stream. So, carbonate salts may also form during the dry scrubbing of the flue gas stream. For example, $NaHCO_3$ injected into the flue gas stream thermally decomposes to $Na_2CO_3$, and the $Na_2CO_3$ will subsequently react with sulfur oxides to form $Na_2SO_4$. A suitable filtration system may be used to separate the formed solid particles e.g., $Na_2CO_3$ and $Na_2SO_4$. Suitable filtration step may include a bag filter or Electrostatic Precipitators (ESP) for separating the solid particles.

For wet scrubbing of the flue gas stream, caustic (NaOH) can be used as a scrubbing reagent. Caustic contacted with the flue gas stream, reacts with sulfur oxides to produce liquid sodium salts in the form of $Na_2SO_3$, and/or $Na_2SO_4$.

The scrubbing step removes $SO_2$ and $SO_3$ from the flue gas by converting it to sodium salts. The sodium salts so produced are continuously purged from the scrubbing section.

The presence of halogens in the feed may result in the formation of dioxins and/or furans. These compounds must be removed before the gases can be vented. Therefore, the flue gas from the scrubbing section may be sent to an optional nitrogen oxide removal section and dioxin/furans destruction section. A fuel gas stream and air are also passed to the nitrogen oxide removal section for combustion. An ammonia and/or urea stream can also be introduced into the nitrogen oxide removal section. Any dioxin or furan compounds in the flue gas stream from the scrubbing section are removed and/or NOx is reduced to N2 to form a treated gas in the nitrogen oxide removal section. The treated gas can be vented to the atmosphere in line 282. In the absence of any halogens in the feed, the flue gas from the scrubbing section would be the treated gas stream which can then be vented in line 282 from a stack into the atmosphere.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Further, the FIGURE shows one or more exemplary sensors such as 12, 22, 32, 42, and 52, located on one or more conduits. Nevertheless, there may be sensors present on every stream so that the corresponding parameter(s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Example

A process simulation example was performed to demonstrate the selective removal of hydrogen sulfide from a portion of the stripper off-gas stream employing a very short contact time of the caustic stream with the treated stream. The simulation results are shown in the Table below:

TABLE

|  | SOR | EOR |
| --- | --- | --- |
| Off-gas Stream Flow Rate, (kg/hr) | 1736.4 kg/hr (3828.1 lb/hr) | 3147.0 kg/hr (6938.1 lb/hr) |
| $H_2S$, mol ppm | 818 | 988 |
| $CO_2$, mol % | 12.8 | 16.4 |

TABLE-continued

|  | SOR | EOR |
| --- | --- | --- |
| Temperature, ° F. | 127 | 135 |
| Stoichiometric Caustic required for the removal of both $H_2S$ and $CO_2$, (kg/hr) (10 wt % Caustic solution) | ~5443.1 kg/hr (12000 lb/hr) | ~12473.8 kg/hr (27500 lb/hr) |
| Caustic rate required based on simulation results for selective removal of $H_2S$ to achieve ~50 mol ppm, (kg/hr) (10 wt % Caustic solution) | 90.7 to 113.4 (kg/hr) (200-250 lb/hr) | ~181.4 to 226.8 (kg/hr) (400-500 lb/hr) |
| Contact time | 2 seconds | 2 milliseconds |

As shown in the Table, at SOR due to significantly lower off-gas rate and lesser absolute quantity of $CO_2$, contact time of about 2 seconds was required to achieve <50 mol ppm of $H_2S$. For EOR, due to the higher amount of $CO_2$, pH is lower than 10. So, in order to shift the pH to above 10, significantly lower contact time was needed. Lower residence time or contact time ensures less $CO_2$ pickup by the caustic to maintain pH value greater than 10 with less carbonate and bicarbonate buildup. As per the simulation results, for EOR contact time of about 2 milliseconds was required to achieve less than 50 mol ppm of $H_2S$. As evident form the Table, with the selective caustic treatment of the off-gas stream, the caustic required for $H_2S$ removal is significantly reduced as compared to the amount of stoichiometric caustic required for the removal of both $H_2S$ and $CO_2$. Accordingly, the overall caustic required for the treatment of off-gas stream to remove both $H_2S$ and $CO_2$ was decreased with selective caustic.

Specific Embodiments

While the following is described in conjunction with specific embodiments, it will be understood that this description is intended to illustrate and not limit the scope of the preceding description and the appended claims.

A first embodiment of the present disclosure is a process for hydrotreating a feedstock, the process comprising hydrotreating a feed stream comprising a feedstock in the presence of a hydrotreating hydrogen stream and a hydrotreating catalyst to provide a hydrotreated stream; separating the hydrotreated stream into a hydrotreated liquid stream and a hydrotreated gas stream; stripping the hydrotreated liquid stream to provide a stripper off-gas stream; and contacting at least a portion of the stripper off-gas stream with a caustic stream to provide a sulfur-lean gas stream and a sulfur-rich spent caustic stream. An embodiment of the present disclosure is one, any or all of prior embodiments in this paragraph up through the first embodiment in this paragraph wherein the step of contacting the at least a portion of the stripper off-gas stream with the caustic stream comprises selectively removing sulfur from the at least a portion of the off-gas stream. An embodiment of the present disclosure is one, any or all of prior embodiments in this paragraph up through the first embodiment in this paragraph further comprising combusting sulfur in the sulfur-rich spent caustic stream to provide sodium salts and a flue gas stream; and purifying the flue gas stream to provide a treated gas stream. An embodiment of the present disclosure is one, any or all of prior embodiments in this paragraph up through the first embodiment in this paragraph wherein the step of stripping the hydrotreated liquid stream comprises passing the hydrotreated liquid stream to a stripper column to provide an overhead gaseous stream and a bottoms stream comprising diesel; condensing the overhead gaseous stream to provide the stripper off-gas stream and a stripper overhead liquid stream; contacting the stripper off-gas stream with a sponge oil stream in a sponge absorber to provide a LPG hydrocarbons rich sponge oil stream and a sponge off-gas stream comprising one or more of hydrogen sulfide, water, and carbon dioxide; and contacting at least a portion of the sponge off-gas stream with the caustic stream to provide a sulfur-lean sponge off-gas stream and the sulfur-rich spent caustic stream. An embodiment of the present disclosure is one, any or all of prior embodiments in this paragraph up through the first embodiment in this paragraph wherein the step of contacting the at least a portion of the sponge off-gas stream with the caustic stream comprises selectively removing a greater proportion of hydrogen sulfide from the sponge off-gas stream than carbon dioxide in the sulfur-rich caustic stream. An embodiment of the present disclosure is one, any or all of prior embodiments in this paragraph up through the first embodiment in this paragraph wherein the step of contacting the at least a portion of the sponge off-gas stream with the caustic stream comprises splitting the sponge off-gas stream into a first portion and a second portion of the sponge off-gas stream; and contacting the first portion of the sponge off-gas stream with the caustic stream to provide the sulfur-lean sponge off-gas stream and the sulfur-rich spent caustic stream. An embodiment of the present disclosure is one, any or all of prior embodiments in this paragraph up through the first embodiment in this paragraph further comprising fractionating the stripper overhead liquid stream and/or the LPG hydrocarbons rich sponge oil stream in a fractionator to provide a fractionator overhead gaseous stream and a fractionator bottoms naphtha stream; condensing the fractionator overhead gaseous stream to provide a fractionator off-gas stream and a liquid stream comprising LPG hydrocarbons; purifying a first portion of the liquid stream comprising LPG hydrocarbons in a caustic scrubber to provide a sulfur-lean LPG stream and a spent caustic stream; and recycling a second portion of the liquid stream comprising LPG hydrocarbons to the fractionator. An embodiment of the present disclosure is one, any or all of prior embodiments in this paragraph up through the first embodiment in this paragraph further comprising treating the sulfur-rich spent caustic stream and the spent caustic stream in a thermal oxidation unit. An embodiment of the present disclosure is one, any or all of prior embodiments in this paragraph up through the first embodiment in this paragraph, wherein treating the sulfur-rich spent caustic stream and the spent caustic stream comprises passing the sulfur-rich spent caustic stream to the thermal oxidation unit; and combusting sulfur present in the sulfur-rich spent caustic stream to provide a flue gas stream comprising sulfur oxide. An embodiment of the present disclosure is one, any or all of prior embodiments in this paragraph up through the first embodiment in this paragraph further comprises passing a hydrocarbonaceous gas stream to the thermal oxidation unit. An embodiment of the present disclosure is one, any or all of prior embodiments in this paragraph up through the first embodiment in this paragraph wherein the hydrocarbonaceous gas stream comprises the second portion of the sponge off-gas stream. An embodiment of the present disclosure is one, any or all of prior embodiments in this paragraph up through the first embodiment in this paragraph wherein the sponge oil stream comprises one or more of fractionator bottoms naphtha stream and the bottoms stream comprising diesel. An embodiment of the present disclosure is one, any or all of prior embodiments in this paragraph up through the first embodiment in this paragraph further comprising splitting the hydrotreated gas stream into a recycle gas stream and a purge gas stream; recovering hydrogen from the purge gas stream to provide a hydrogen rich gas stream and a tail gas stream; and passing the tail gas stream to the sponge absorber to contact with the sponge oil stream. An embodiment of the present disclosure is one, any or all of prior embodiments in this paragraph up through the first embodiment in this paragraph where in the feedstock comprises a biorenewable feed. An embodiment of the present disclosure is one, any or all of prior embodiments in this paragraph up through the first embodiment in this paragraph further comprising contacting the at least a portion of the off-gas stream with the caustic stream for a time period ranging from about 2 milliseconds to about 2 seconds to selectively remove sulfur from the at least a portion of the off-gas stream.

A second embodiment of the present disclosure is a process for hydrotreating a feedstock, the process comprising hydrotreating a feed stream comprising a biorenewable feedstock in the presence of a hydrotreating hydrogen stream and hydrogen sulfide and a hydrotreating catalyst to provide a hydrotreated stream; separating the hydrotreated stream into a hydrotreated liquid stream and a hydrotreated gas stream; stripping the hydrotreated liquid stream to provide a stripper off-gas stream; contacting at least a portion of the stripper off-gas stream with a caustic stream to provide a sulfur-lean gas stream and a sulfur-rich spent caustic stream; combusting sulfur in the sulfur-rich spent caustic stream to provide a flue gas stream comprising sulfur oxide; and treating the flue gas stream with a scrubbing reagent to produce salts and provide a treated gas stream. An embodiment of the present disclosure is one, any or all of prior embodiments in this paragraph up through the second embodiment in this paragraph wherein the step of contacting the at least a portion of the stripper off-gas stream with the caustic stream comprises selectively removing sulfur from the at least a portion of the off-gas stream. An embodiment of the present disclosure is one, any or all of prior embodiments in this paragraph up through the second embodiment in this paragraph wherein the step of contacting the at least a portion of the stripper off-gas stream with the caustic stream comprises contacting the at least a portion of the stripper off-gas stream with a sponge oil stream in a sponge absorber to provide a sponge off-gas stream and a LPG hydrocarbons rich sponge oil stream; splitting the sponge off-gas stream into a first portion and a second portion of the sponge off-gas stream; and contacting the first portion of the sponge off-gas stream with the caustic stream. An embodiment of the present disclosure is one, any or all of prior embodiments in this paragraph up through the second embodiment in this paragraph further comprising combusting the second portion of the sponge off-gas stream along with the sulfur in the sulfur-rich spent caustic stream to provide the flue gas stream.

A third embodiment of the present disclosure is an apparatus for hydrotreating a feedstock, comprising a biorenewable hydrotreating reactor for hydrotreating a biorenewable feedstock; a purification unit comprising a solid media; a stripper column in downstream fluid communication with the purification unit; a sponge absorber column in downstream fluid communication with the purification unit and the stripper column; a caustic scrubber column in fluid communication with the sponge absorber column via an overhead line; and a thermal oxidation unit in downstream fluid communication with the caustic scrubber column via a spent caustic stream.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the present disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydrotreating a feedstock, the process comprising:
   hydrotreating a feed stream comprising a feedstock in the presence of a hydrotreating hydrogen stream and a hydrotreating catalyst to provide a hydrotreated stream;
   separating said hydrotreated stream into a hydrotreated liquid stream and a hydrotreated gas stream;
   passing the hydrotreated liquid stream to a stripper column to provide an overhead gaseous stream and a bottoms stream comprising diesel product;
   condensing the overhead gaseous stream to provide a stripper off-gas stream and a stripper overhead liquid stream; and
   contacting at least a portion of the stripper off-gas stream with a caustic stream to provide a sulfur-lean gas stream and a sulfur-rich spent caustic stream,
   wherein the step of contacting the at least a portion of the stripper off-gas stream with the caustic stream comprises selectively removing a greater proportion of hydrogen sulfide from the stripper off-gas stream than carbon dioxide in the sulfur-rich caustic stream.

2. The process of claim 1 wherein the step of contacting the at least a portion of the stripper off-gas stream with the caustic stream comprises selectively removing sulfur from the at least a portion of the off-gas stream.

3. The process of claim 1 further comprising combusting sulfur in the sulfur-rich spent caustic stream to provide sodium salts and a flue gas stream; and purifying the flue gas stream to provide a treated gas stream.

4. The process of claim 1 wherein the step of stripping said hydrotreated liquid stream further comprises:
   contacting the stripper off-gas stream with a sponge oil stream in a sponge absorber column to provide a LPG hydrocarbons rich sponge oil stream and a sponge off-gas stream comprising one or more of hydrogen sulfide, water, and carbon dioxide; and
   contacting at least a portion of the sponge off-gas stream with the caustic stream to provide a sulfur-lean sponge off-gas stream and the sulfur-rich spent caustic stream.

5. The process of claim 4 wherein the step of contacting the at least a portion of the sponge off-gas stream with the caustic stream comprises:
   splitting the sponge off-gas stream into a first portion and a second portion of the sponge off-gas stream; and
   contacting the first portion of the sponge off-gas stream with the caustic stream to provide the sulfur-lean sponge off-gas stream and the sulfur-rich spent caustic stream.

6. The process of claim 4 further comprising:
   fractionating the stripper overhead liquid stream and/or the LPG hydrocarbons rich sponge oil stream in a fractionator to provide a fractionator overhead gaseous stream and a fractionator bottoms naphtha stream;
   condensing the fractionator overhead gaseous stream to provide a fractionator off-gas stream and a liquid stream comprising LPG hydrocarbons;
   purifying a first portion of the liquid stream comprising LPG hydrocarbons in a caustic scrubber to provide a sulfur-lean LPG stream and a spent caustic stream; and
   recycling a second portion of the liquid stream comprising LPG hydrocarbons to the fractionator.

7. The process of claim 6 further comprising treating the sulfur-rich spent caustic stream and the spent caustic stream in a thermal oxidation unit.

8. The process of claim 7, wherein treating the sulfur-rich spent caustic stream and the spent caustic stream comprises:
   passing the sulfur-rich spent caustic stream to the thermal oxidation unit; and
   combusting sulfur present in the sulfur-rich spent caustic stream to provide a flue gas stream comprising sulfur oxide.

9. The process of claim 8 further comprises passing a hydrocarbonaceous gas stream to the thermal oxidation unit.

10. The process of claim 9 wherein the hydrocarbonaceous gas stream comprises the second portion of the sponge off-gas stream.

11. The process of claim 6 wherein the sponge oil stream comprises one or more of fractionator bottoms naphtha stream and the bottoms stream comprising diesel.

12. The process of claim 4 further comprising splitting said hydrotreated gas stream into a recycle gas stream and a purge gas stream;
   recovering hydrogen from the purge gas stream to provide a hydrogen rich gas stream and a tail gas stream; and
   passing the tail gas stream to the sponge absorber column to contact with the sponge oil stream.

13. The process of claim 1 where in the feedstock comprises a biorenewable feed.

14. The process of claim 2 further comprising contacting the at least a portion of the off-gas stream with the caustic stream for a time period ranging from about 2 milliseconds to about 2 seconds to selectively remove sulfur from the at least a portion of the off-gas stream.

15. A process for hydrotreating a feedstock, the process comprising:
   hydrotreating a feed stream comprising a biorenewable feedstock in the presence of a hydrotreating hydrogen stream and hydrogen sulfide and a hydrotreating catalyst to provide a hydrotreated stream;
   separating said hydrotreated stream into a hydrotreated liquid stream and a hydrotreated gas stream;
   passing the hydrotreated liquid stream to a stripper column to provide an overhead gaseous stream and a bottoms stream comprising diesel product;
   condensing the overhead gaseous stream to provide a stripper off-gas stream and a stripper overhead liquid stream;
   contacting at least a portion of the stripper off-gas stream with a caustic stream to provide a sulfur-lean gas stream and a sulfur-rich spent caustic stream;
   combusting sulfur in the sulfur-rich spent caustic stream to provide a flue gas stream comprising sulfur oxide; and
   treating the flue gas stream with a scrubbing reagent to produce salts and provide a treated gas stream, wherein the step of contacting the at least a portion of the stripper off-gas stream with the caustic stream comprises selectively removing a greater proportion of hydrogen sulfide from the stripper off-gas stream than carbon dioxide in the sulfur-rich caustic stream.

16. The process of claim 15 wherein the step of contacting the at least a portion of the stripper off-gas stream with the caustic stream comprises:
   contacting the at least a portion of the stripper off-gas stream with a sponge oil stream in a sponge absorber to provide a sponge off-gas stream and a LPG hydrocarbons rich sponge oil stream comprising LPG hydrocarbons;
   splitting the sponge off-gas stream into a first portion and a second portion of the sponge off-gas stream; and
   contacting the first portion of the sponge off-gas stream with the caustic stream.

17. The process of claim 16 further comprising combusting the second portion of the sponge off-gas stream along with the sulfur in the sulfur-rich spent caustic stream to provide the flue gas stream.

* * * * *